US007631085B2

(12) United States Patent
Vedantham et al.

(10) Patent No.: US 7,631,085 B2
(45) Date of Patent: Dec. 8, 2009

(54) POINT-TO-POINT DELIVERY VERIFICATION REPORT MECHANISM FOR POINT-TO-MULTIPOINT TRANSMISSION SYSTEMS

(75) Inventors: Ramakrishna Vedantham, Irving, TX (US); David Leon, Irving, TX (US); Igor Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 1049 days.

(21) Appl. No.: 10/930,703

(22) Filed: Aug. 30, 2004

(65) Prior Publication Data

US 2006/0069802 A1    Mar. 30, 2006

(51) Int. Cl.
*G06F 15/16* (2006.01)
(52) U.S. Cl. .................. 709/227; 455/515; 370/312
(58) Field of Classification Search .......... 709/227; 370/312; 455/515
See application file for complete search history.

(56) References Cited

U.S. PATENT DOCUMENTS

| 6,278,716 | B1 * | 8/2001 | Rubenstein et al. ........ 370/432 |
| 6,526,022 | B1 | 2/2003 | Chiu et al. | |
| 7,363,047 | B2 * | 4/2008 | Yi et al. ................ 455/515 |
| 2004/0215551 | A1 * | 10/2004 | Eder ...................... 705/38 |
| 2005/0083884 | A1 * | 4/2005 | Lee et al. ............... 370/331 |
| 2005/0165945 | A1 * | 7/2005 | Lee et al. ............... 709/232 |
| 2006/0190503 | A1 * | 8/2006 | Naicken et al. .......... 707/204 |
| 2008/0307041 | A1 * | 12/2008 | Bouazizi et al. ......... 709/227 |

FOREIGN PATENT DOCUMENTS

WO    2005/078999    8/2005

OTHER PUBLICATIONS

Injong Rhee, Nallathambi Balaguru, George N. Rouskas, MTCP: scalable TCP-like congestion control for reliable multicast, Computer Networks, vol. 38, Issue 5, Apr. 5, 2002, pp. 553-575, ISSN 1389-1286, DOI: 10.1016/S1389-1286(01)00268-7.*
Stockhammer, T.; Hannuksela, M.M.; Wiegand, T., "H.264/AVC in wireless environments," Circuits and Systems for Video Technology, IEEE Transactions on , vol. 13, No. 7, pp. 657-673, Jul. 2003.*
G. Pospischil, J. Stadler, and I. Miladinovic. A location-based push architecture using SIP. 4th International Symposium on Wireless Personal Multimedia Communications (WPMC 2001), Aalborg, Denmark, Sep. 2001.*
Ericsson: "MBMS Content Delivery Reporting," Tdoc S4-040270, 3GPP TSG-SA4#31, May 17-21, 2004, XP002365305, p. 1.
Nokia: "Scalable point-to-point repair for MBMS downloading," Tdoc S4-AHP110, 3GPP TSG-SA4 PSM SWG Ad Hoc Meeting, Apr. 5-7, 2004, Lund, Sweden, pp. 1-6.

(Continued)

*Primary Examiner*—Vivek Srivastava
*Assistant Examiner*—Ajay Bhatia

(57) ABSTRACT

Methods, systems, transmitters, receivers, network elements and software applications in a system for acknowledging the reception of sets of data objects, wherein one or more transmitters transmit one or more sets of data objects within respective point-to-multipoint transmission sessions to a plurality of receivers, and wherein repair requests and/or delivery verification reports are transmitted by at least one of said receivers to network elements within point-to-point transmission sessions. Different back-off times are assigned for delivery verification reports and repair requests, at least two delivery verification reports of one receiver are jointly transmitted within one point-to-point transmission session, and a delivery verification report is transmitted after a completed repair session within the same point-to-point transmission session used by the repair session. Furthermore, a minimum set of parameters to be sent in delivery verification reports is shown.

48 Claims, 3 Drawing Sheets

OTHER PUBLICATIONS

"3rd Generation Partnership Project; Technical Specification Group Services and System Aspects; Multimedia Broadcast/Multicast Service; Protocols and Codecs (Release 6)", 3GPP TS 26.346 V1.0.0; Sep. 2004, pp. 1-30.

Nokia: "Content delivery verification in MBMS", Tdoc S4-AHP158, 3GPP TSG-SA4 PSM SWG #6 ad-hoc Meeting, Oct. 11-13, 2004, Newbury, U.K., pp. 1-5.

Nokia et al: "FLUTE for MBMS downloading," Tdoc S4-030772, 3GPP TSG-SA4#29 Meeting, Nov. 24-28, 2003, Tampere, Finland, pp. 1-10.

"3rd Generation Partnership Project; Technical Specification Group Services and System Aspects; Multimedia Broadcast/Multicast Service (MBMS) user services; Stage 1 (Release 6)", 3GPP TS 22.246 V6.1.0 ; Mar. 2004, pp. 1-16.

"RTP: A Transport Protocol for Real-Time Applications" by H. Schulzrinne et al; IETF Standard, Internet Engineering Task Force, IETF, CH, Jul. 2003.

Open Mobile Alliance: "Generic Content Download Over the Air Specification", Version 1.0, Proposed Version Jun. 20, 2002, XP-002264099, pp. 1-40.

3GPP TSG-SA4#30 Meeting, Tdoc S4-040092, XP-002375820, "Point-to-point repair for MBMS downloading", Feb. 23-27, 2004, Malaga, Spain.

Technical Specification Group Services and System Aspects, SA4#0, Tdoc S4-040038, XP-002375819, "Point-to-point repair mechanism for MBMS file download service" Feb. 23-27, 2004, Malaga, Spain, pp. 1-4.

"Generic Content Download Over the Air Specification", Version 1.0, Proposed Version Jun. 20, 2002, Open Mobile Alliance, pp. 1-40.

3GPP TSG-SA4#31, May 17-21, 2004, Tdoc S4-040270 "MBMS Content Delivery Reporting", one page.

* cited by examiner

US 7,631,085 B2

POINT-TO-POINT DELIVERY VERIFICATION REPORT MECHANISM FOR POINT-TO-MULTIPOINT TRANSMISSION SYSTEMS

FIELD OF THE INVENTION

This invention relates to methods, systems, transmitters, receivers, network elements and software applications in a system for acknowledging the reception of sets of data objects, wherein one or more transmitters transmit one or more sets of data objects within respective point-to-multipoint transmission sessions to a plurality of receivers, and wherein repair requests and/or delivery verification reports are transmitted by at least one of said receivers to network elements within point-to-point transmission sessions.

BACKGROUND OF THE INVENTION

For point-to-multipoint services (also denoted as one-to-many services) over systems such as the Internet Protocol (IP) multicast, the IP Data Casting (IPDC) and the Multimedia Broadcast/Multicast Services (MBMS) as defined by the Third Generation Partnership Project (3GPP), file delivery such as for instance the download of multimedia files is an important service.

MBMS define a mechanism to deliver multimedia content to the mobiles (receivers) over a Point-to-Multipoint (PtM) bearer. Using a PtM bearer instead of multiple PtP bearers to deliver bandwidth-intensive multimedia content results in an efficient usage of available spectrum and other resources.

Feedback from the mobile could be useful for many purposes e.g., retransmission, rate adaptation and Delivery Verification (DV) etc. For PtP sessions, there already exist well-defined mechanisms to provide feedback and to utilize feedback for Quality of Service (QoS) improvement and charging.

However, for PtM connections, feedback from the mobiles could result in feedback implosion at the sender. Yet it is desirable to have at least some feedback from all the users participating in the PtM session:

Feedback from the mobiles with unsuccessful reception can be used to serve them over a PtP repair session that follows the original PtM session.

Feedback from the mobiles with successful reception can be used for charging purposes. This is termed as "Delivery Verification" in publication 3GPP TS 22.246: "MBMS User Services: Stage 1", wherein section 5.3 of this publication defines general requirements for DV and Annex A of this publication provides some use cases for DV.

DV reporting can be important for carriers for various reasons, that includes (but is not limited to), charging the customer for services rendered, market research surveys, QoS adaptation etc. Content delivery is done over a PtM bearer, but DV is usually done over PtP bearers.

PtP connections for DV reporting from thousands of mobiles to a small set of report servers could overload the system due to feedback implosion. Moreover, a mobile could have participated in multiple MBMS sessions during a certain period of time. Sending the DV reports separately for each MBMS session is inefficient.

For mobiles with unsatisfactory reception, PtP repair sessions need to be scheduled immediately after the MBMS session, whereas DV reports may be scheduled over a longer period of time.

PtP connections for both classes of users must be efficiently scheduled to balance the overall load on the system. An efficient and extensible format, appropriate scheduling and the protocol elements for DV reports that take into account the above concerns does not exist in the MBMS.

3GPP technical document S4-040270, "MBMS Content Delivery Reporting", proposes to uses the same overload prevention mechanisms for scheduling both DV reports and PtP repair requests and to execute DV reporting schemes after PtP repair schemes. But DV reports do not scale in the same way as PtP repairs i.e., typically 5% of users may need PtP repairs whereas 100% of users may have to perform DV reporting. This approach thus can not be considered optimum.

SUMMARY OF THE INVENTION

In view of the above-mentioned problems, the present invention proposes methods, systems, transmitters, receivers, network elements and software applications for an efficient acknowledging of sets of data objects that are transmitted in respective point-to-multipoint transmission sessions from one or more transmitters to a plurality of receivers.

According to a first aspect of the present invention, a method is proposed for acknowledging the reception of sets of data objects, comprising transmitting a set of data objects from a transmitter to a plurality of receivers within a point-to-multipoint transmission session, and signaling a maximum verification wait time to said receivers, wherein at least one time instant at which at least one of said receivers is allowed to transmit a delivery verification report to acknowledge reception of said transmitted set of data objects at least partially depends on said signaled maximum verification wait time.

Said data objects may for instance be packets of information-carrying symbols as for instance binary digits. These data objects are transmitted in sets of data objects, wherein each set may for instance associate a plurality of data objects with each other. For instance, a set of data objects may represent a data stream or a file.

Said sets of data objects are transmitted from a transmitter to a plurality of receivers within a point-to-multipoint transmission session. This may be a broadcast or unicast session. Said transmission may take place wireless or wire-bound. Said transmission session may for instance be an MBMS session, or one out of several transport sessions within an MBMS session, wherein one or several transmitters are involved. In that case, the point-to-multipoint transfer of each set of data objects is associated with a respective point-to-multipoint transmission session. Said transmission session may for instance be controlled by the File Delivery over Unidirectional Transport (FLUTE) protocol.

At least one receiver out of said plurality of receivers that take part in said point-to-multipoint transmission session might completely receive said set of data objects that is transmitted within said point-to-multipoint transmission session. Said complete reception of said set of data objects may for instance be understood in a way that all data objects of said set of data objects that were actually transmitted by said transmitter are received at said at least one receiver, or that a certain fraction of data objects that were actually transmitted by said transmitter are received at said at least one receiver, but wherein said fraction of received data objects is large enough to enable said at least one receiver to completely reconstruct the content which said transmitted set of data objects represents.

To acknowledge the reception of said set of data objects, said at least one receiver transmits a delivery verification report. This report may for instance be transmitted to a delivery verification report server that may be co-located or even identical with said transmitter or not. Said delivery verification report server may use the delivery verification reports received from said at least one receiver for instance for billing purposes or for QoS monitoring.

At least one time instant at which said at least one receiver is allowed to transmit said delivery verification report to acknowledge reception of said transmitted set of data objects at least partially depends on a maximum verification wait time. Said at least one time instant may for instance be a single time instant, or a couple of time instances, e.g. in the shape of a time interval. Said maximum verification wait time may for instance indicate, when added to a time instant that is associated with a certain event, for instance the completion of said point-to-multipoint transmission session, the latest time instant at which a delivery verification report is allowed to be sent from said at least one receiver. For instance, it may be prescribed that said delivery verification report is only allowed to be transmitted within a time interval (i.e. a plurality of adjacent time instants) that is defined by the time instant at which said point-to-multipoint transmission is complete and the time instant at which said point-to-multipoint transmission is complete plus said maximum verification wait time.

According to the first aspect of the present invention, said maximum verification wait time is signaled to said receivers, and the at least one time instant at which said receivers are allowed to transmit their delivery verification reports at least partially depends on said signaled maximum verification wait time. In contrast to the prior art, where receivers transmit their delivery verification reports immediately after the point-to-multipoint transmission session is complete or immediately after a repair session is complete, the approach according to the present invention allows to at least partially influence the time instants at which said receivers are allowed to transmit delivery verification reports, and thus effectively the time instants at which said receivers actually transmit delivery verification reports. Furthermore, depending on the algorithm, according to which said receivers determine the time instants at which they are allowed to transmit delivery verification reports, the probability of a concurrent transmission of several delivery verification reports from several respective receivers can be reduced if, for instance, said receivers randomly choose a time instant from an interval that is at least partially determined by said maximum verification wait time. Even further, due to the fact that said maximum verification wait time is signaled to said receivers, a flexible adaptation of the maximum verification wait time to system and content characteristics is possible, for instance, by choosing a shorter maximum verification wait time, a faster acknowledgement of the sets of data objects can be realized.

In this way, the first aspect of the present invention thus contributes to reducing congestion and/or implosion of the system and provides means for at least partially controlling the time instants at which the receivers transmit their delivery verification reports.

According to a preferred embodiment of the method according to the first aspect of the present invention, said delivery verification report is transmitted to a delivery verification report server within a point-to-point transmission session. Said delivery verification report server may for instance perform billing or QoS monitoring of said point-to-multipoint transmission session, and may be co-located or even identical with said transmitter or not. Said point-to-point transmission session may for instance be based on a Transport Control Protocol (TCP) and may only be established for the transmission of said delivery verification report.

According to a preferred embodiment of the method according to the first aspect of the present invention, said method further comprises signaling a maximum repair wait time to said receivers, wherein at least one time instant at which at least one of said receivers is allowed to transmit a repair request to indicate that reception of at least one repair data object is required at least partially depends on said signaled maximum repair wait time. Additionally signaling a maximum repair wait time to said receivers allows to at least partially control the time instant at which receivers, which did not receive all or enough data objects of said set of data objects to be able to decode the content that data objects are related to, transmit their repair requests. These repair requests may for instance be transmitted to a repair server that re-transmits data objects that are required by said at least one receiver as repair data objects. It may for instance be prescribed that receivers are allowed to transmit repair request only within a time interval that is determined by a time instant of a certain event, for instance the completion of said point-to-multipoint transmission session, and said time instant plus said maximum repair wait time. If, for instance, each receiver determines his time instant for the transmission of a repair request by randomly choosing a time instant from said time interval that is at least partially determined by said maximum repair wait time, the probability of concurrent repair request stemming from several receivers is vastly reduced, and congestion and/or implosion of the system can be efficiently avoided. Furthermore, the independent choice and signaling of the maximum repair wait time with respect to the maximum verification wait time allows to independently influence the transmission processes of repair requests and delivery verification reports, respectively. Therein, said time interval in which repair request are allowed to be transmitted may overlap with said time interval in which said delivery verification reports are allowed to be transmitted or not.

According to a preferred embodiment of the method according to the first aspect of the present invention, said repair request is transmitted to a repair request server within a point-to-point transmission session. Said repair request server may be co-located or even identical with said transmitter and/or said delivery verification report server, or not. Said point-to-point transmission session, which is a repair session in which data objects or parts thereof are re-transmitted to said receivers, may for instance be controlled by the Transport Control Protocol (TCP).

According to a preferred embodiment of the method according to the first aspect of the present invention, said at least one time instant at which at least one of said receivers is allowed to transmit a delivery verification report is determined by randomly selecting a value within the interval between zero and said maximum verification wait time and adding said selected value to a time instant at which said point-to-multipoint transmission session is complete, and said at least one time instant at which at least one of said receivers is allowed to transmit a repair request is determined by randomly selecting a value within the interval between zero and said maximum repair wait time and adding said selected value to a time instant at which said point-to-multipoint transmission session is complete. Said randomly selected values may for instance obey a uniform distribution that is determined by the respective interval boundaries or any other kind of probability distribution.

According to a preferred embodiment of the method according to the first aspect of the present invention, said maximum repair wait time is smaller than or equal to said maximum verification wait time. This accounts for the fact that the transmission of repair request may be considered more important and urgent than the transmission of delivery verification reports, as in case of the transmission of repair requests, reception of further repair data objects is required at the receivers to allow the receivers to decode the content, whereas in case of the transmission of delivery verification reports, decoding of content is already possible.

According to a preferred embodiment of the method according to the first aspect of the present invention, said method further comprises signaling an identifier of said delivery notification report server, and an identifier of said repair server to said receivers. This may be of particular importance if the delivery notification report server and the repair server are neither explicitly known to the receivers nor can be implicitly be deduced from the context.

According to a preferred embodiment of the method according to the first aspect of the present invention, said signaling of said wait times and said identifiers takes place during an announcement phase of said point-to-multipoint transmission session.

According to a preferred embodiment of the method according to the first aspect of the present invention, said signaling of said times and said identifiers is accomplished by a Session Description Protocol.

According to a preferred embodiment of the method according to the first aspect of the present invention, said signaling of said wait times and said identifiers takes place during said transmission of said set of data objects from said transmitter to said receivers.

According to a preferred embodiment of the method according to the first aspect of the present invention, said transmission of said set of data objects from said transmitter to said receivers is at least partially controlled by the File Transfer over Unidirectional Transport protocol, and said signaling of said times and said identifiers is accomplished via a File Delivery Table instance of said protocol.

According to a preferred embodiment of the method according to the first aspect of the present invention, one or more transmitters transmit at least two sets of data objects within respective point-to-multipoint transmission sessions to at least one receiver out of said plurality of receivers, said at least one receiver transmits only one delivery verification report, and said only one delivery verification report acknowledges the reception of at least two of said at least two sets of data objects transmitted within respective point-to-multipoint transmission sessions. At least one receiver out of said plurality of receivers then is involved in at least two point-to-multipoint transmission sessions, wherein in each point-to-multipoint transmission session, one respective set of data objects is transmitted. Said at least two point-to-multipoint transmission sessions may be supported by one or more transmitters. For instance, a first transmitter may transmit a first set of data objects within a first point-to-multipoint transmission session to a first plurality of receivers, and a second transmitter may transmit a second set of data objects within a second point-to-multipoint transmission session to a second plurality of receivers. Said at least one receiver then belongs to the intersection of said first and second plurality of receivers. Said first and second point-to-multipoint transmission sessions may temporally overlap or not. For instance, said at least one receiver may receive a first set of data objects within a first point-to-multipoint transmission session, and subsequently may receive a second set of data objects within a second point-to-multipoint transmission session, wherein said first and second point-to-multipoint transmission sessions may be supported by one or more transmitters.

To acknowledge the reception of at least two of said at least two sets of data objects transmitted within respective point-to-multipoint transmission sessions, said at least one receiver only transmits one delivery verification report. This report then contains acknowledgements for said at least two sets of data objects, and may advantageously be transmitted within a single point-to-point transmission. In contrast to prior art, where for each received set of data objects, a respective delivery verification reports is transmitted in a respective point-to-point transmission session, which has to be established and released with fixed protocol overhead, according to this embodiment of the present invention, at least two delivery verification reports are combined into one delivery verification report that then can efficiently be transmitted within a single point-to-point transmission session, thus vastly reducing the protocol overhead for connection establishment and release.

According to a preferred embodiment of the method according to the first aspect of the present invention, said delivery verification report at least comprises an identifier of said transmitter, an identifier of said delivery verification report server, an identifier of said point-to-multipoint transmission session, and an identifier of said at least one receiver that transmits said delivery verification report. Said identifiers of said transmitter and said delivery verification report server may for instance be a Uniform Resource Identifier (URI) or an Internet Protocol (IP) address, and said identifier of said point-to-multipoint transmission session may for instance be a Transport Session Identifier (TSI).

According to a preferred embodiment of the method according to the first aspect of the present invention, said delivery verification report further comprises an installation notification related to an installation of said transmitted set of data objects at said at least one receiver. Said installation notification may for instance acknowledge successful reception and installation of a media object on said at least one receiver or indicate failure of said installation due to a plurality of reasons. Examples of said installation notification may for instance be the installation status codes as defined by the Open Mobile Alliance (OMA).

According to a preferred embodiment of the method according to the first aspect of the present invention, said identifiers are included in an Extended Markup Language object.

According to a preferred embodiment of the method according to the first aspect of the present invention, said Extended Markup Language object is contained in a Hypertext Transfer Protocol object.

According to a preferred embodiment of the method according to the first aspect of the present invention, said one delivery verification report comprises one set of identifiers for each of said at least two sets of data objects the reception of which is acknowledged, each of said sets of identifiers comprises an identifier of the transmitter related to the respective acknowledged set of data objects, an identifier of the delivery verification report server related to the respective acknowledged set of data objects, an identifier of the point-to-multipoint transmission session related to the respective acknowledged set of data objects, and an identifier of said at least one receiver that transmits said one delivery verification report, each of said sets of identifiers is contained in an Extended Markup Language object, and said Extended Markup Language objects are contained in a multipart Multi-purpose Internet Mail Extensions structure of an Hypertext Transfer Protocol object. Said Extended Markup Language objects then may be separated from each other by MIME boundaries.

According to the first aspect of the present invention, it is further proposed a system for acknowledging the reception of sets of data objects, comprising a transmitter, and a plurality of receivers; wherein said transmitter comprises means arranged for transmitting a set of data objects to said receivers within a point-to-multipoint transmission session, and means for signaling a maximum verification wait time to said receivers; and wherein at least one of said receivers comprises means arranged for transmitting a delivery verification report to acknowledge reception of said transmitted set of data objects, wherein at least one time instant at which said delivery verification report is allowed to be transmitted at least partially depends on said signaled maximum verification wait time.

According to the first aspect of the present invention, it is further proposed a transmitter in a system for acknowledging the reception of sets of data objects, said transmitter comprising means arranged for transmitting a set of data objects from said transmitter to a plurality of receivers within a point-to-multipoint transmission session, and means arranged for signaling a maximum verification wait time to said receivers, wherein at least one time instant at which at least one of said receivers is allowed to transmit a delivery verification report to acknowledge reception of said transmitted set of data objects at least partially depends on said signaled maximum verification wait time.

According to the first aspect of the present invention, it is further proposed a software application executable in a transmitter of a system for acknowledging the reception of sets of data objects, the software application comprising program code for causing said transmitter to transmit a set of data objects from a transmitter to a plurality of receivers within a point-to-multipoint transmission session, and program code for causing said transmitter to signal a maximum verification wait time to said receivers, wherein at least one time instant at which at least one of said receivers is allowed to transmit a delivery verification report to acknowledge reception of said transmitted set of data objects at least partially depends on said signaled maximum verification wait time.

Said software application may also be a computer program product, comprising program code that is stored on a computer-readable medium, as for instance a memory.

According to the first aspect of the present invention, it is further proposed a receiver in a system for acknowledging the reception of sets of data objects, said receiver comprising means arranged for receiving a set of data objects transmitted from a transmitter to a plurality of receivers within a point-to-multipoint transmission session, and means arranged for receiving a maximum verification wait time transmitted to said receivers, wherein at least one time instant at which said receiver is allowed to transmit a delivery verification report to acknowledge reception of said transmitted set of data objects at least partially depends on said signaled maximum verification wait time.

According to the first aspect of the present invention, it is further proposed a software application executable in a receiver of a system for acknowledging the reception of sets of data objects, the software application comprising program code for causing said receiver to receive a set of data objects transmitted from a transmitter to a plurality of receivers within a point-to-multipoint transmission session, and program code for causing said receiver to receive a maximum verification wait time transmitted to said receivers, wherein at least one time instant at which said receiver is allowed to transmit a delivery verification report to acknowledge reception of said transmitted set of data objects at least partially depends on said signaled maximum verification wait time.

Said software application may also be a computer program product, comprising program code that is stored on a medium, as for instance a memory.

According to the first aspect of the present invention, it is further proposed a network element in a system for acknowledging the reception of sets of data objects, wherein a set of data objects is transmitted from a transmitter to a plurality of receivers within a point-to-multipoint transmission session, and wherein a maximum verification wait time is signaled to said receivers, said network element comprising means arranged to receive a delivery verification report transmitted by at least one of said receivers to acknowledge reception of said transmitted set of data objects, wherein at least one time instant at which said delivery verification report is allowed to be transmitted at least partially depends on said signaled maximum verification wait time. Said network element may for instance be a delivery verification report server.

According to a second aspect of the present invention, it is proposed a method for acknowledging the reception of sets of data objects, wherein one or more transmitters transmit at least two sets of data objects within respective point-to-multipoint transmission sessions to at least one receiver, the method comprising transmitting only one delivery verification report from said at least one receiver, wherein said one delivery verification report acknowledges the reception of at least two of said at least two sets of data objects transmitted within respective point-to-multipoint transmission sessions at said at least one receiver.

At least two sets of data objects are transmitted within respective point-to-multipoint transmission sessions to at least one receiver, i.e. each set of data objects is transmitted in a separate point-to-multipoint transmission session, respectively. Said at least two point-to-multipoint transmission sessions corresponding to said at least two sets of data objects that are transmitted to said at least one receiver may temporally overlap or may take place one after the other. Said at least two sets of data objects may be transmitted by the same transmitter or by several transmitters.

According to the second aspect of the present invention, said at least one receiver only transmits one delivery verification report, which acknowledges the reception of at least two sets of data objects of at least two respective point-to-multipoint transmission sessions. Thus in contrast to the prior art, where each received set of data objects is acknowledged with a separate delivery verification report, the present invention proposes to combine acknowledgements of at least two received sets of data objects into one combined delivery verification report and thus may contribute to reducing overhead and the amount of concurrently transmitted delivery verification reports that may cause congestion and/or implosion of the system.

According to a preferred embodiment of the method according to the second aspect of the present invention, said delivery verification report is transmitted to a delivery verification report server within a point-to-point transmission session. Combining several delivery verification reports into one single delivery verification report and transmitting this single delivery verification report within only one point-to-point transmission session represents a significant reduction of the protocol overhead that is involved with the establishment and release of point-to-point transmission sessions, because instead of several establishments and releases of several point-to-point transmission sessions, as required in the prior art, the establishment and release of only one point-to-point transmission session within which said single delivery verification message is transmitted is required.

According to a preferred embodiment of the method according to the second aspect of the present invention, said at least one receiver stores a set of identifiers for each of said at least two sets of data objects transmitted within a respective point-to-multipoint transmission session, and each of said sets of identifiers comprises an identifier of the respective transmitter that transmitted said respective set of data objects, an identifier of the respective delivery verification report server the reception of said set of data objects is to be acknowledged to, and an identifier of said respective point-to-multipoint transmission session within which said set of data objects is transmitted. Said sets of identifiers are stored irrespective of the fact whether said corresponding set of data objects has already been received yet or not.

According to a preferred embodiment of the method according to the second aspect of the present invention, said step of transmitting said one delivery verification report comprises the sub-steps of setting a value T_empty to a future time instant; for each respective set of data objects received at said at least one receiver, determining a respective time instant at which a delivery verification report is best transmitted to acknowledge the reception of said respective set of data objects, and setting said value T_empty to said respective time instant, if said respective time instant is smaller than T_empty; for each set of data objects received at said at least one receiver, entering the respective set of identifiers into a queue; if a current time equals T_empty, transmitting all sets of identifiers contained in said queue as content of said one delivery verification report, emptying said queue and setting said value T_empty to a future time instant.

Said future time instant may for instance be determined by adding a pre-defined time duration to a current time instant. For each received set of data objects, thus a respective time instant is determined at which transmission of a delivery verification report is best performed. This may for instance be accomplished by randomly choosing a time value from a time interval that is defined by the completion time of a point-to-multipoint transmission session in which said set of data objects was transmitted and said completion time plus a maximum verification wait time. By setting said value T_empty to said determined time instant if said determined time instant is smaller than T_empty, and by transmitting all sets of identifiers contained in said queue in one single delivery verification report if T_empty equals a current time instant, it is assured that all delivery verification reports associated with respective received sets of data objects are transmitted before or at said time instant that has been determined for the acknowledgement of said respective set of data objects.

According to a preferred embodiment of the method according to the second aspect of the present invention, said respective time instants at which a delivery verification report is best transmitted to acknowledge reception of said respective sets of data objects are determined by randomly selecting a respective value within an interval between zero and a maximum verification wait time, and adding said respective selected value to a time instant at which said respective point-to-multipoint transmission session in which said respective set of data objects is transmitted is complete.

According to a preferred embodiment of the method according to the second aspect of the present invention, said maximum verification wait time is signaled to said at least one receiver by said one or more transmitters.

According to a preferred embodiment of the method according to the second aspect of the present invention, said maximum verification wait time is a pre-defined parameter that is known to said at least one receiver.

According to a preferred embodiment of the method according to the second aspect of the present invention, if the processing of said sub-steps is disturbed and, if after the disturbance, it is found that a current time is larger than said value T_empty, said last sub-step is performed. Said disturbance may for instance be caused by a receiver leaving the transmission coverage area of a transmitter, or by a receiver being disconnected from power, for instance due to lack of battery power or user switch-off.

According to a preferred embodiment of the method according to the second aspect of the present invention, if it is detected that said queue is approaching overflow, said last sub-step is performed even when it is found that a current time is smaller than T_empty.

According to a preferred embodiment of the method according to the second aspect of the present invention, each of said at least two sets of data objects is related to a respective delivery verification report server the reception of said respective set of data objects is to be acknowledged to, and said one delivery verification report acknowledges the reception of at least two of said at least two sets of data objects that are related to at least two different delivery verification report servers. Delivery verification reports may thus also be combined into a single delivery verification report although they are bound for different delivery verification report servers.

According to a preferred embodiment of the method according to the second aspect of the present invention, said one delivery verification report is transmitted to that delivery verification report server of said at least two different delivery verification report servers that is more easily accessible, and said delivery verification report server that is more easily accessible signals information on the acknowledgement of the set of data objects that is to be acknowledged to the other delivery verification report server to said other delivery verification report server.

According to a preferred embodiment of the method according to the second aspect of the present invention, at least one time instant, at which said at least one receiver is allowed to transmit a repair request to a repair server within a point-to-point transmission to indicate that reception of at least one repair data object that is related to one of said transmitted sets of data objects, is determined by randomly selecting a value within an interval between zero and a maximum repair wait time, and by adding said selected value to a time instant at which said point-to-multipoint transmission session within which said set of data objects, to which said at least one repair data object is related, is transmitted is complete.

According to a preferred embodiment of the method according to the second aspect of the present invention, said maximum repair wait time is smaller than or equal to said maximum verification wait time.

According to a preferred embodiment of the method according to the second aspect of the present invention, said one delivery verification report comprises one set of identifiers for each of said at least two sets of data objects the reception of which is acknowledged, each of said sets of identifiers comprises an identifier of the transmitter related to the respective acknowledged set of data objects, an identifier of the delivery verification report server related to the respective acknowledged set of data objects, an identifier of the point-to-multipoint transmission session related to the respective acknowledged set of data objects, and an identifier of said at least one receiver that transmits said one delivery verification report, each of said sets of identifiers is contained in an Extended Markup Language object, and said Extended Markup Language objects are contained in a multipart Multipurpose Internet Mail Extensions structure of an Hypertext Transfer Protocol object.

According to a preferred embodiment of the method according to the second aspect of the present invention, each of said sets of identifiers further comprises an installation notification related to an installation of said respective acknowledged set of data objects at said at least one receiver.

According to the second aspect of the present invention, it is further proposed a system for acknowledging the reception of sets of data objects, comprising one or more transmitters, and at least one receiver, wherein said transmitters comprise means arranged for transmitting at least two sets of data objects within respective point-to-multipoint transmission sessions to at least one receiver, and wherein said at least one receiver comprises means arranged for transmitting a delivery verification report, wherein said delivery verification report acknowledges the reception of at least two of said at least two sets of data objects transmitted within respective point-to-multipoint transmission sessions at said at least one receiver.

According to the second aspect of the present invention, it is further proposed a transmitter in a system for acknowledging the reception of sets of data objects, comprising means arranged for transmitting at least one set of data objects within a respective point-to-multipoint transmission sessions to at least one receiver, wherein at least two sets of data objects are transmitted from one or more transmitters within respective point-to-multipoint transmission sessions to said at least one receiver, wherein only one delivery verification report is transmitted from said at least one receiver, and wherein said one delivery verification report acknowledges the reception of at least two of said at least two sets of data objects transmitted within respective point-to-multipoint transmission sessions at said at least one receiver.

According to the second aspect of the present invention, it is further proposed a receiver in a system for acknowledging the reception of sets of data objects, comprising means arranged for receiving at least two sets of data objects transmitted within respective point-to-multipoint transmission sessions by one or more transmitters, and means arranged for transmitting a delivery verification report, wherein said delivery verification report acknowledges the reception of at least two of said at least two sets of data objects transmitted within respective point-to-multipoint transmission sessions.

According to the second aspect of the present invention, it is further proposed a software application executable in a receiver of a system for acknowledging the reception of sets of data objects, said software application comprising program code for causing said receiver to receive at least two sets of data objects transmitted within respective point-to-multipoint transmission sessions by one or more transmitters, and program code for causing said receiver to transmit a delivery verification report, wherein said delivery verification report acknowledges the reception of at least two of said at least two sets of data objects transmitted within respective point-to-multipoint transmission sessions.

Said software application may also be a computer program product, comprising program code that is stored on a medium, as for instance a memory.

According to the second aspect of the present invention, it is further proposed a network element in a system for acknowledging the reception of sets of data objects, wherein one or more transmitters transmit at least two sets of data objects within respective point-to-multipoint transmission sessions to at least one receiver, said network element comprising means arranged for receiving a delivery verification report transmitted from said at least one receiver, wherein said delivery verification report acknowledges the reception of at least two of said at least two sets of data objects transmitted within respective point-to-multipoint transmission sessions at said at least one receiver. Said network element may for instance be a delivery verification report server.

According to the second aspect of the present invention, it is further proposed a software application executable in a network element of a system for acknowledging the reception of sets of data objects, wherein one or more transmitters transmit at least two sets of data objects within respective point-to-multipoint transmission sessions to at least one receiver, said software application comprising program code for causing said network element to receive a delivery verification report transmitted from said at least one receiver, wherein said delivery verification report acknowledges the reception of at least two of said at least two sets of data objects transmitted within respective point-to-multipoint transmission sessions at said at least one receiver.

Said software application may also be a computer program product, comprising program code that is stored on a computer-readable medium, as for instance a memory.

According to a third aspect of the present invention, a method for acknowledging the reception of a set of data objects is proposed, wherein a transmitter transmits a set of data objects within a point-to-multipoint transmission session to a plurality of receivers, the method comprising transmitting a delivery verification report from at least one receiver out of said plurality of receivers to a delivery verification report server, wherein said delivery verification report acknowledges the reception of said set of data objects, and at least comprises an identifier of said transmitter, an identifier of said delivery verification report server, an identifier of said point-to-multipoint transmission session, and an identifier of said at least one receiver that transmits said delivery verification report.

Thus according to the third aspect of the present invention, for the first time a minimum set of parameters that have to be comprised in a delivery verification report is proposed. These parameters are required by the delivery verification report server to process said delivery verification report received from said at least one receiver. Said identifiers for said transmitter and said delivery verification report server may for instance be URIs or IP addresses, said identifiers of said point-to-multipoint transmission session may for instance be a Transport Session Identifier (TSI) as defined by the FLUTE protocol, and said identifier of said at least one receiver may be any identifier that allows for a unique identification of said at least one receiver, for instance a character string or a number.

According to a preferred embodiment of the method according to the third aspect of the present invention, said delivery verification report further comprises an installation notification related to an installation of said transmitted set of data objects at said at least one receiver. Said installation notification may for instance acknowledge successful reception and installation of a media object on said at least one receiver. Examples of said installation notification may for instance be the installation status codes as defined by the Open Mobile Alliance (OMA).

According to a preferred embodiment of the method according to the third aspect of the present invention, said identifiers are included in an Extended Markup Language object.

According to a preferred embodiment of the method according to the third aspect of the present invention, said Extended Markup Language object is contained in a Hypertext Transfer Protocol object.

According to the third aspect of the present invention, a system for acknowledging the reception of a set of data objects is proposed, said system comprising a transmitter and a plurality of receivers, wherein said transmitter comprises means arranged for transmitting a set of data objects within a point-to-multipoint transmission session to said receivers, and wherein at least one of said receivers comprises means arranged for transmitting a delivery verification report to a delivery verification report server, wherein said delivery verification report acknowledges the reception of said sets of data objects, and at least comprises an identifier of said transmitter, an identifier of said delivery verification report server, an identifier of said point-to-multipoint transmission session, and an identifier of said at least one receiver that transmits said delivery verification report.

According to the third aspect of the present invention, a transmitter in a system for acknowledging the reception of a set of data objects is proposed, said transmitter comprising means arranged for transmitting a set of data objects within a point-to-multipoint transmission session to a plurality of receivers, wherein a delivery verification report is transmitted from at least one receiver out of said plurality of receivers to a delivery verification report server, and wherein said delivery verification report acknowledges the reception said sets of data objects, and at least comprises an identifier of said transmitter, an identifier of said delivery verification report server, an identifier of said point-to-multipoint transmission session, and an identifier of said at least one receiver that transmits said delivery verification report.

According to the third aspect of the present invention, a receiver in a system for acknowledging the reception of a set of data objects is proposed, said receiver comprising means arranged for receiving a set of data objects transmitted from a transmitter within a point-to-multipoint transmission session to a plurality of receivers, and means arranged for transmitting a delivery verification report from said receiver to a delivery verification report server, wherein said delivery verification report acknowledges the reception of said set of data objects, and at least comprises an identifier of said transmitter, an identifier of said delivery verification report server, an identifier of said point-to-multipoint transmission session, and an identifier of said receiver.

According to the third aspect of the present invention, a software application executable in a receiver of a system for acknowledging the reception of sets of data objects is proposed, said software application comprising program code for causing said receiver to receive a set of data objects transmitted from a transmitter within a point-to-multipoint transmission session to a plurality of receivers, and program code for causing said receiver to transmit a delivery verification report from said receiver to a delivery verification report server, wherein said delivery verification report acknowledges the reception of said set of data objects, and at least comprises an identifier of said transmitter, an identifier of said delivery verification report server, an identifier of said point-to-multipoint transmission session, and an identifier of said receiver.

Said software application may also be a computer program product, comprising program code that is stored on a medium, as for instance a memory.

According to the third aspect of the present invention, a network element in a system for acknowledging the reception of a set of data objects is proposed, wherein a transmitter transmits a set of data objects within a point-to-multipoint transmission session to a plurality of receivers, said network element comprising means arranged for receiving a delivery verification report transmitted from at least one receiver out of said plurality of receivers, wherein said delivery verification report acknowledges the reception of said set of data objects, and at least comprises an identifier of said transmitter, an identifier of said delivery verification report server, an identifier of said point-to-multipoint transmission session, and an identifier of said at least one receiver that transmits said delivery verification report. Said network element may for instance be a delivery verification report server.

According to the third aspect of the present invention, a software application executable in a network element of a system for acknowledging the reception of sets of data objects is proposed, wherein one or more transmitters transmit at least two sets of data objects within respective point-to-multipoint transmission session to at least one receiver, said software application comprising program code for causing said network element to receive a delivery verification report transmitted from at least one receiver out of said plurality of receivers, wherein said delivery verification report acknowledges the reception of said set of data objects, and at least comprises an identifier of said transmitter, an identifier of said delivery verification report server, an identifier of said point-to-multipoint transmission session, and an identifier of said at least one receiver that transmits said delivery verification report.

Said software application may also be a computer program product, comprising program code that is stored on a computer-readable medium, as for instance a memory.

According to a fourth aspect of the present invention, a method for acknowledging the reception of a set of data objects is proposed, wherein a transmitter transmits a set of data objects within a point-to-multipoint transmission session to a plurality of receivers, said method comprising transmitting a repair request from at least one receiver out of said plurality of receivers to a network element within a point-to-point transmission session to trigger a re-transmission of at least one data object out of said set of data objects in case said at least one data object was not received at said at least one receiver, and subsequently transmitting a delivery verification report from said at least one receiver to said network element in said same point-to-point transmission session to acknowledge the reception of all data objects of said set of data objects.

According to this fourth aspect of the present invention, it is thus proposed that a delivery verification report is transmitted after the transmission of a repair request, and uses the same point-to-point transmission that was used for said transmission of said repair request. Said repair request is sent by said at least one receiver to a repair server to trigger the transmission of repair data objects, which are data objects that already have been transmitted in said sets of data objects but were not received at said at least one receiver. After the reception of said re-transmitted data objects, said at least one receiver may then acknowledge the reception of the set of data objects, wherein said received set of data objects then actually is composed of data objects that were received at once (without re-transmission) and data objects only received after re-transmission. Said re-transmission of said data objects may take place within the same point-to-point transmission session in which said repair request was transmitted, for instance in a repair session.

Thus according to the fourth aspect of the present invention, the same point-to-point transmission session may be used for the transmission of the repair request from said at least one receiver to said repair server, for the re-transmission of data objects from said repair server to said at least one receiver, and for the transmission of the delivery verification report from said at least one receiver to a delivery verification report server. This does not necessarily imply that said repair server and said delivery notification report server are identical, it may also well be the case that said delivery verification report is received from said repair server and then routed to said delivery verification report server. Apparently, only one point-to-point transmission session may have to be established and released for the repair session and the transmission of the delivery verification report, and in contrast to the prior art approach, where for the repair session, a first point-to-point transmission session is required and for the transmission of the delivery verification report, a second point-to-point transmission session is required, a significant reduction of protocol overhead is achieved, thus rendering the proposed approach more efficient.

According to a preferred embodiment of the method according to the fourth aspect of the present invention, at least one time instant at which said at least one receiver is allowed to transmit said repair request is determined by randomly selecting a value within an interval between zero and a maximum repair wait time and adding said selected value to a time instant at which said point-to-multipoint transmission session is complete.

According to a preferred embodiment of the method according to the fourth aspect of the present invention, said delivery verification report at least comprises an identifier of said transmitter, an identifier of said network element, an identifier of said point-to-multipoint transmission session, and an identifier of said at least one receiver that transmits said delivery verification report.

According to a preferred embodiment of the method according to the fourth aspect of the present invention, said delivery verification report further comprises an installation notification related to an installation of said transmitted set of data objects at said at least one receiver.

According to a preferred embodiment of the method according to the fourth aspect of the present invention, said identifiers are included in an Extended Markup Language object.

According to a preferred embodiment of the method according to the fourth aspect of the present invention, said Extended Markup Language object is contained in a Hypertext Transfer Protocol object.

According to the fourth aspect of the present invention, it is further proposed a system for acknowledging the reception of a set of data objects, comprising a transmitter, and a plurality of receivers, wherein said transmitter comprises means arranged for transmitting a set of data objects within a point-to-multipoint transmission session to said receivers, and wherein at least one of said receivers comprises means arranged for transmitting a repair request to a network element within a point-to-point transmission session to trigger a re-transmission of at least one data object out of said set of data objects in case said at least one data object was not received at said at least one receiver, and means arranged for subsequently transmitting a delivery verification report to said network element in said same point-to-point transmission session to acknowledge the reception of all data objects of said set of data objects.

According to the fourth aspect of the present invention, it is further proposed a transmitter in a system for acknowledging the reception of a set of data objects, said transmitter comprising means arranged for transmitting a set of data objects within a point-to-multipoint transmission session to a plurality of receivers, wherein a repair request is transmitted from at least one receiver out of said plurality of receivers to a network element within a point-to-point transmission session to trigger a re-transmission of at least one data object out of said set of data objects in case said at least one data object was not received at said at least one receiver, wherein a delivery verification report is subsequently transmitted from said at least one receiver to said network element in said same point-to-point transmission session to acknowledge the reception of all data objects of said set of data objects.

According to the fourth aspect of the present invention, a receiver in a system for acknowledging the reception of a set of data objects is further proposed, said receiver comprising means arranged for receiving a set of data objects transmitted from a transmitter within a point-to-multipoint transmission session to a plurality of receivers, means arranged for transmitting a repair request to a network element within a point-to-point transmission session to trigger a re-transmission of at least one data object out of said set of data objects in case said at least one data object was not received at said receiver, and means arranged for subsequently transmitting a delivery verification report to said network element in said same point-to-point transmission session to acknowledge the reception of all data objects of said set of data objects.

According to the fourth aspect of the present invention, it is further proposed a software application executable in a receiver of a system for acknowledging the reception of sets of data objects, said software application comprising program code for causing said receiver to receive a set of data objects transmitted from a transmitter within a point-to-multipoint transmission session to a plurality of receivers, program code for causing said receiver to transmit a repair request to a network element within a point-to-point transmission session to trigger a re-transmission of at least one data object out of said set of data objects in case said at least one data object was not received at said receiver, and program code for causing said receiver to subsequently transmit a delivery verification report to said network element in said same point-to-point transmission session to acknowledge the reception of all data objects of said set of data objects.

Said software application may also be a computer program product, comprising program code that is stored on a computer-readable medium, as for instance a memory.

According to the fourth aspect of the present invention, it is further proposed a network element in a system for acknowledging the reception of a set of data objects, wherein a transmitter transmits a set of data objects within a point-to-multipoint transmission session to a plurality of receivers, said network element comprising: means arranged for receiving a repair request transmitted from at least one receiver out of said plurality of receivers within a point-to-point transmission session to trigger a re-transmission of at least one data object out of said set of data objects in case said at least one data object was not received at said at least one receiver, and means arranged for receiving a delivery verification report subsequently transmitted from said at least one receiver in said same point-to-point transmission session to acknowledge the reception of all data objects of said set of data objects. Said network element may for instance be a delivery verification report server.

According to the fourth aspect of the present invention, it is further proposed a software application executable in a network element of a system for acknowledging the reception of sets of data objects, wherein a transmitter transmits a set of data objects within a point-to-multipoint transmission session to a plurality of receivers, said software application comprising program code for causing said network element to receive a repair request transmitted from at least one receiver out of said plurality of receivers within a point-to-point transmission session to trigger a re-transmission of at least one data object out of said set of data objects in case said at least one data object was not received at said at least one receiver, and program code for causing said network element to receive a delivery verification report subsequently transmitted from said at least one receiver in said same point-to-point transmission session to acknowledge the reception of all data objects of said set of data objects.

Said software application may also be a computer program product, comprising program code that is stored on a computer-readable medium, as for instance a memory.

These and other aspects of the invention will be apparent from and elucidated with reference to the embodiments described hereinafter.

As an initial remark, it should be noted that the subject-matter of the introductory part of this patent application may be used to support this detailed description.

The present invention consists of four aspects that allow for a more efficient acknowledgement of sets of data objects that are transmitted within respective Point-to-Multipoint (PtM) transmission sessions. In the following description, these four aspects of the present invention will be discussed by means of preferred embodiments, wherein an exemplary application of the present invention in the context of the 3GPP MBMS system is assumed. It should be noted that the present invention is however not restricted to an application in this context.

Figure 1:
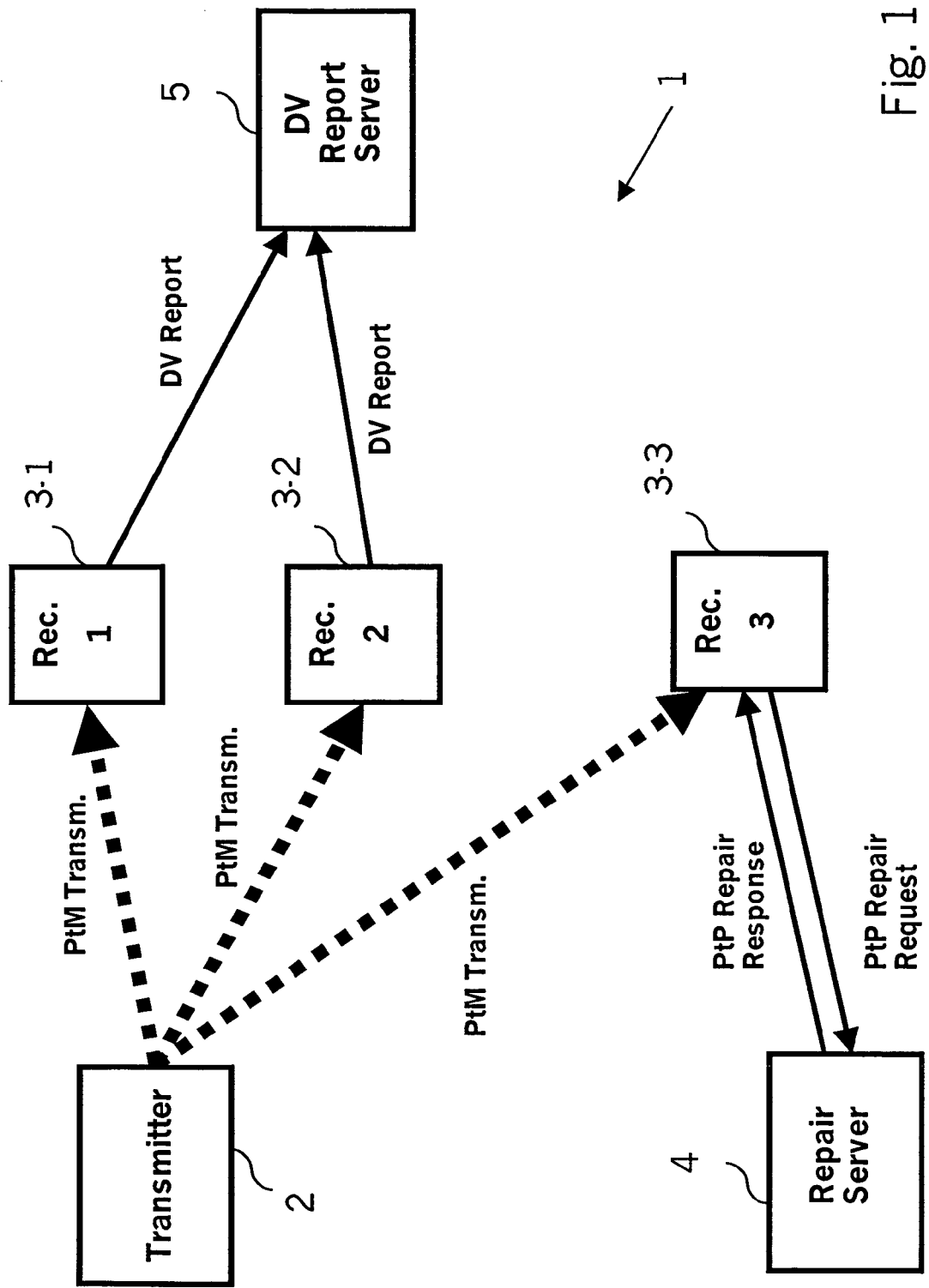
FIG. 1: A schematic presentation of a system according to the present invention, wherein a point-to-multipoint transmission of data objects, a point-to-point repair session and a point-to-point transmission of delivery verification reports take place.

FIG. 1 is schematic presentation of a system 1 according to the present invention. The system 1 comprises a transmitter 2, a plurality of receivers for instance three receivers 3-1 ... 3-3, a repair server 4 and a Delivery Verification (DV) report server 5. Said depicted system may for instance be operated according to the 3GPP MBMS, and then said transmitter can be considered as MBMS server, and said receivers 3-1 ... 3-3 can be considered as MBMS receivers. Said sets of data objects then represent content that is downloaded by said MBMS clients 3-1 ... 3-3 from said MBMS server 2, for instance multimedia files or similar data.

In a PtM transmission, said transmitter 2 transmits a set of data objects to each of the receivers 3-1 ... 3-3 that are within its coverage area (broadcast mode) or are addressed by said set of data objects (multicast mode). In the example of FIG. 1, receivers 3-1 and 3-2 receive the complete set of data objects and then may acknowledge reception of said set of data objects to said DV report server 5.

Receiver 3-3, however, did not receive the complete set of data objects, for instance due to loss or impairment of data objects on the transmission channel between transmitter 2 and receiver 3-3. In order to receive the complete set of data objects, and thus to be able to render the content, said receiver 3-3 then establishes a Point-to-Point (PTP) transmission session (a repair session) with repair server 4 to trigger the re-transmission of data objects that said receiver 3-3 did not yet receive. If only reception of a certain number of data objects is required at said receiver 3-3 to decode and/or render the content, only the number of data objects that allows said receiver 3-3 to decode and/or render the content will be re-transmitted by said repair server 5. To this end, said repair request may for instance comprise an identifier of the PtM transmission session in which said set of data objects was transmitted, for instance a Transport Session Identifier (TSI), and identification of a Transport Object to which said set of data objects belonged, for instance a Transport Object Identifier (TOI), an identification of the transmitter, for instance a Uniform Resource Identifier (URI) or IP address, and an identification of the lacking data objects, for instance a Source Block Number (SBN) and Encoding Symbol ID (ESI), if said transport object is segmented into source blocks and encoding symbols. Herein, the given examples refer to a PtM transmission session that is controlled by the File Delivery over Unidirectional Transport (FLUTE) protocol.

Said data objects required by said receiver 3-3 then are re-transmitted to said receiver 3-3 within said PtP repair session in the shape of a repair response from said repair server 4.

After all required data objects have been received by said receiver 3-3, reception of the complete set of data objects (representing data objects that were received at once, i.e. without re-transmission, and data objects that were only received after re-transmission from a repair server) can be acknowledged to the DV report server 5.

First Aspect of the Invention: Random Time Dispersion of DV Reports and Repair Requests PtP repair requests are usually of higher priority than DV reports. Hence PtP repair requests should advantageously be finished within a short time period after the PtM transmission session. DV reports, in contrast, may be finished over a longer period of time. In addition, not all PtM sessions might require DV reporting.

According to the first aspect of the present invention, it is proposed that the following information is conveyed to each participating receiver for use with subsequent PtP repair and/or DV report purposes.

The URI of the PtP repair server—URI_repair

The maximum back-off time for PtP repair requests—max_wait_time_repair

The URI of the DV report server—URI_verify

The maximum back-off time for DV reports—max_wait_time_verify

Therein, max_wait_time_verify is preferably chosen much larger than max_wait_time_repair to account for the fact that repair request are considered more urgent that DV reports.

This information may preferably be conveyed to the receivers either:

During the PtM session announcement phase as part of the Session Description Protocol (SDP) file, or As part of the File Delivery Table (FDT) Instance during the PtM download session using the FLUTE protocol.

On receipt of max_wait_time_verify, the receiver generates a random number wait_time_verify that is uniformly distributed between zero and max_wait_time_verify. It adds this number to T_session_complete, which denotes the time instant at which the PtM transmission session is completed.

The actual time T_verify at which the receiver needs to send the DV report is then given as $$T\_verify = T\_session\_complete + wait\_time\_verify.$$

Figure 2A:
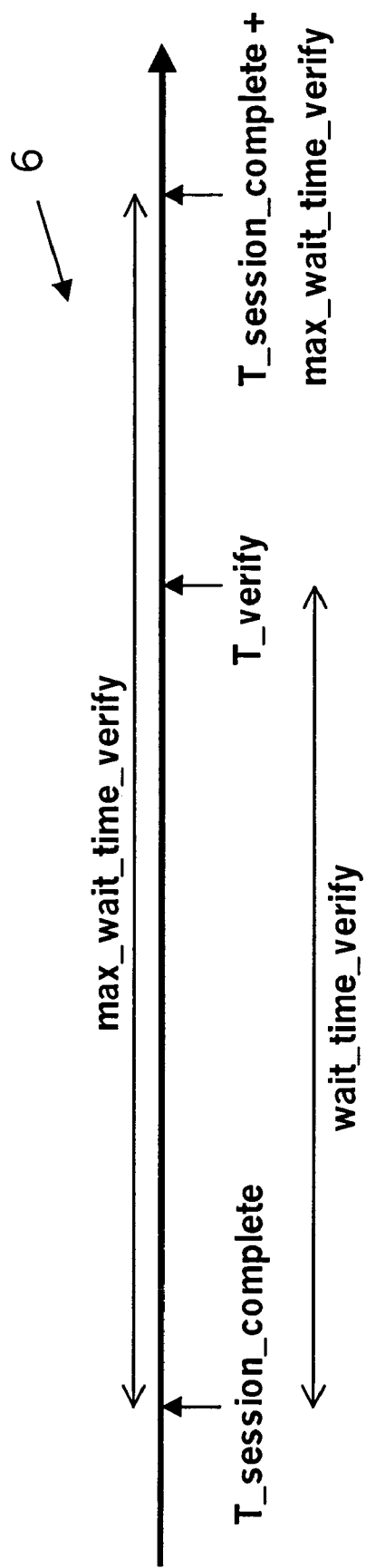
FIG. 2a: a schematic illustration of the determination of time instants at which receivers transmit delivery verification reports according to the present invention.

These relationships are summarized in FIG. 2a, which illustrates the timeline 6 for the transmission of DV reports.

The receiver may then send the DV report when current_time=T_verify.

Alternatively, the receiver may send multiple DV reports in one PtP session with the DV report server, as it is proposed by the second aspect of the present invention.

Figure 2B:
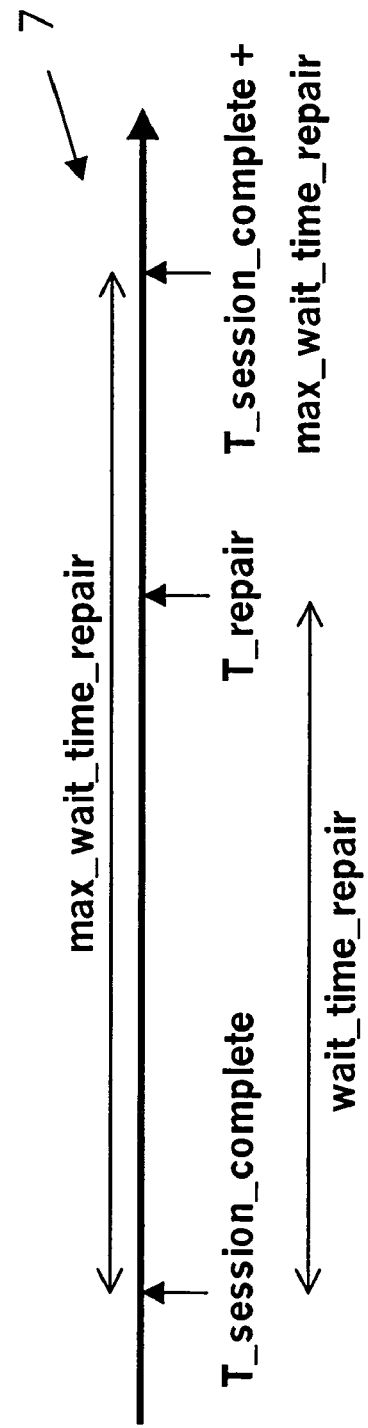
FIG. 2b: a schematic illustration of the determination of time instants at which receivers transmit repair request according to the present invention.

The analogous algorithm is performed to determine the time instant T_repair, at which a PtP repair request may be transmitted by a receiver, based on T_session_complete and max_wait_time_repair. The corresponding timeline 7 is depicted in FIG. 2b. Accordingly, if current_time=T_repair, the receiver may send a repair request.

As can be seen by comparing FIGS. 2a and 2b, transmission of repair request can be temporally privileged with respect to transmission of DV reports by choosing max_wait_time_verify much larger than max_wait_time_repair.

Second Aspect of the Invention: Combination of DV Reports for Multiple PtM Transmission Sessions It is inefficient to have a PtP connection (or PtM transmission session) for each DV report separately, because there is a fixed signalling overhead on the network resources for connection establishment and teardown (release). Instead, according to the second aspect of the present invention, a single PtP connection could be used to send multiple DV reports in a batch.

A simple mechanism to manage the multiple DV reports is given below:

The receiver shall maintain a queue that stores the following elements for each PtM transmission session.

The URI/IP_Address of the PtM transmitter, the URI/IP_Address of the DV report server—URI_verify An identifier of the PtM transmission session in case of the MBMS, this may for instance be the Transport Session Identifier (TSI) for each successfully completed MBMS download session, or a unique identifier for the MBMS streaming session).

The data structure also updates a field T_empty that contains the smallest T_verify of all the PtM transmission sessions with an awaiting delivery verification report.

Figure 3:
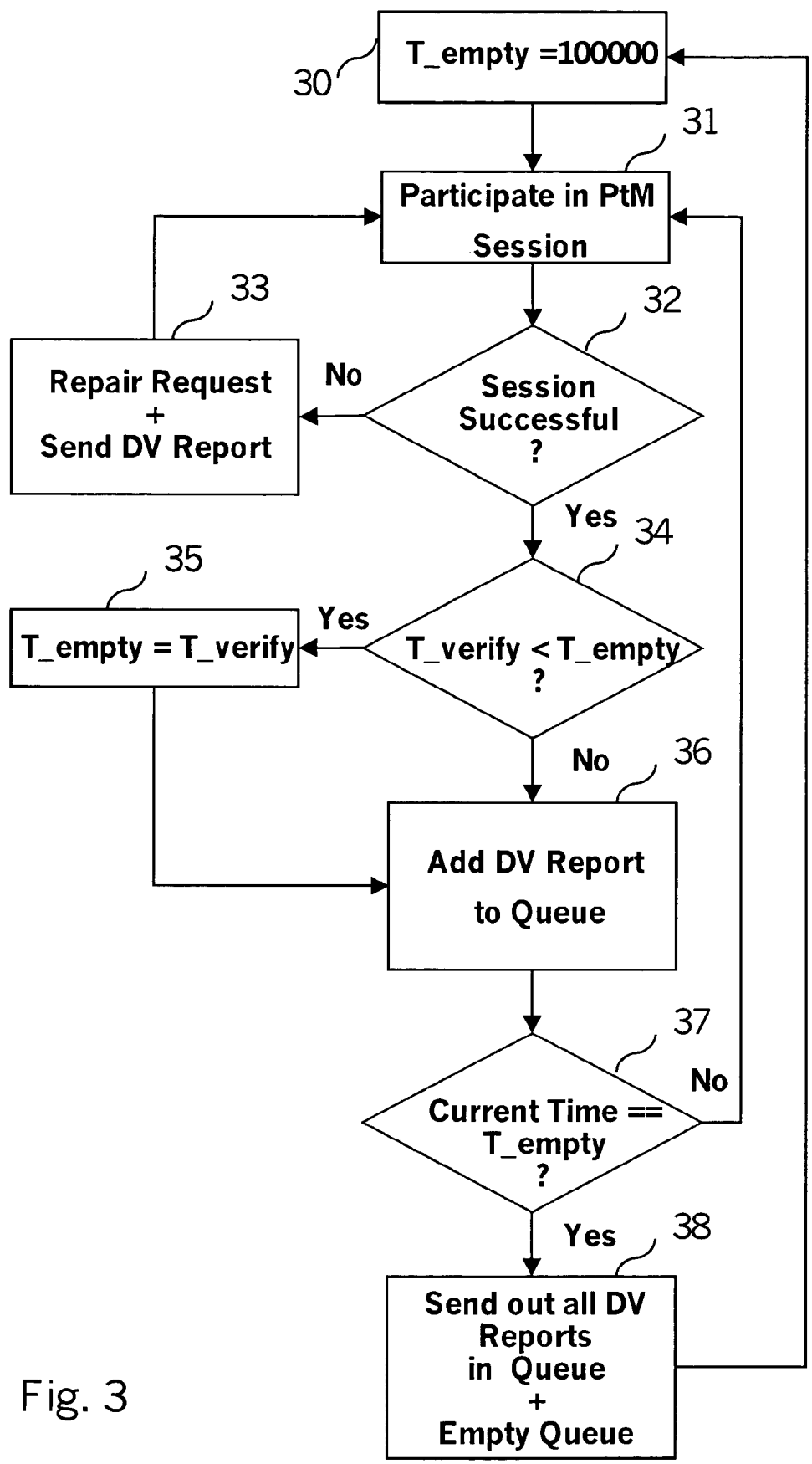
FIG. 3: an exemplary flowchart of one of the methods for acknowledging the reception of sets of data objects according to the present invention.

The following method steps will now be described with reference to the flowchart of FIG. 3.

In a first step 30, T_empty is initialized to a large value, for instance a pre-defined time interval of 100 days may be added to the current time to obtain T_empty.

In a step 31, a receiver participates in a PtM transmission session in order to receive a set of data objects. When a PtM session is found to be unsuccessful in a step 32, for instance because some of the transmitted data objects of a set of data objets were not received at said receiver, in a step 33 a repair request is transmitted to a repair server in order to trigger re-transmission of said lacking data objects, and a DV report for said PtM session is transmitted to the DV report server that is responsible for DV reports of said PtM transmission session. The algorithm then returns to step 31.

Whenever a new PtM session is successfully completed (step 32), the T_verify of that session is determined, for instance as described by the first aspect of the present invention, and then compared with T_empty in a step 34. Depending on the outcome of this comparison, T_empty is updated as follows (see steps 34 and 35):

IF T_verify<T_empty

THEN T_empty=T_verify.

Regardless of the outcome of this comparison, the above-listed elements for the successfully completed PtM session are stored in a queue in a step 36 to serve as content for the single DV report that is to be transmitted to acknowledge the successfully completed PtM sessions.

If current_time=T_empty holds, which is checked for in a step 37, the receiver establishes a PtP connection with the local DV report server, which may for instance be the DV report server (URI_verify) that is most easily accessible, and transmits the contents of said queue as single DV report to said local DV report server within a PtP transmission session, for instance in the format according to the third aspect of the present invention. Then the receiver empties the queue and resets T_empty again to a large value. These actions are performed in a step 38, and subsequently, the algorithm returns to step 30. If current_time=T_empty does not hold in step 37, the algorithm returns to step 31.

In a further embodiment of the present invention, the receiver, for instance a mobile phone, could be turned off or stay out of service area for an extended period of time. In such a case, whenever the receiver is turned on, it can check if current_time>=T_empty. If yes, then it should immediately establish a PtP connection and empty the queue.

In a further embodiment of the present invention, the queue might overflow with a huge number of pending DV reports. In such a case, the receiver might decide to empty the queue by sending the reports even though current_time<T_empty holds.

In yet a further embodiment of the present invention, it may be possible that a couple of different DV report server addresses (URI_verify) have been stored in said queue, and that the receiver is in a far-off-location, from where some of the URI_verify in the queue may be inaccessible. Even if all the URI_verify in the queue are accessible, it may be inefficient to make a separate PtP connection with each DV report server. Thus the receiver may connect to the local DV report server, for instance the closest or most easily accessible DV report server, and upload the DV reports. The local DV report server may in turn route the DV reports to the corresponding DV report server.

Third Aspect of the Invention: Content Delivery Verification Report Format

For each successful PtM session that requires DV reporting, according to the third aspect of the present invention, the receiver shall transmit at least the following information as part of the DV report:

The URI or IP Address of the PtM transmitter, an identifier of the PtM transmission session (for instance the Transport Session Identifier (TSI) in the context of the FLUTE protocol), a unique identification of the receiver, and the URI or IP Address of the DV report server—URI_verify.

These parameters are included in an Extended Markup Language (XML) object that follows the XML scheme as shown below:

```
<?xml version="1.0" encoding="UTF-8"?>
    <xs:schema xmlns:xs="http://www.w3.org/2001/XMLSchema"
               xmlns:fl="http://www.example.com/mbms"
               elementFormDefault:xs="qualified"
targetNamespace:xs="http://www.example.com/mbms">
        <xs:element name="content-DV-report">
            <xs:complexType>
                <xs:sequence>
                    <xs:attribute name="URI-PtM-Transmitter"
                           type="xs:anyURI"
                           use="required"/>
                    <xs:attribute name="Transport-Session-
                                  Identifier"
                           type="xs:positiveInteger"
                           use="required"/>
                    <xs:attribute name="Unique-Receiver-ID"
                           type="xs:unsignedLong"
                           use="required"/>
                    <xs:attribute name="URI-Verify"
                           type="xs:anyURI"
                           use="required"/>
                </xs:sequence>
            </xs:complexType>
        </xs:element>
    </xs:schema>
```

In an embodiment of the current invention, a DV report could also contain an installation notification, in order to provide the PtP transmitter (e.g. a download server) with an indication that the set of data objects (e.g. a media object) has been properly received and installed at said receiver or that said installation was not successful due to a plurality of reasons, as for instance insufficient memory, device abort or user cancellation. For instance, the receiver could add a status code notification such as one defined in section 5.2 of the Open Mobile Alliance (OMA) document titled "Generic Content Download Over The Air Specification Version 1.0 Version 21-February-2003" to the DV report.

The optional parameters of the DV report are included by extending the above XML scheme, for instance, by adding the following lines to the XML scheme.

```
<xs:attribute name="Any-new-parameter"
       type="xs:parameterType"
       use="optional"/>
```

Any other parameters like QoE metrics may optionally be included similarly in the XML scheme.

In a further embodiment of the present invention, the XML object that contains the DV report may be sent as the body of a Hypertext Transfer Protocol (HTTP) POST method. An example is given below:

```
POST http://www.localserver.com/report HTTP/1.1
Content-Type: application/xml
Content-Length: 489
<?xml version="1.0" encoding="UTF-8"?>
    <content-DV-report
        xmlns:xsi="http://www.w3.org/2001/XMLSchema-
                   instance"
        xmlns:fl="http://www.example.com/mbms"
        xsi:schemaLocation="http://www.example.com/mbms-6-
                            content-DV-report.xsd"
        URI-PtM-Sender="http://www.example.com/menu/
                        tracklist.html"
        Transport-Session-Identifier ="12345"
        Unique-Receiver-ID ="9726809082"
        URI-Verify = "http://www.greatmusic.com/report"
        Install-Status-Code = "201"
    </content-DV-report>
```

The XML objects corresponding to multiple DV reports may be combined into a single report by using the multipart Multiple Internet Mail Extensions (MIME) structure in HTTP. An example that shows how to combine multiple DV reports is shown below:

```
POST http://www.localserver.com/report HTTP/1.1
Content-Type: multipart/mixed;
boundary = BOUNDARY_CONTENT_DELIVERY_VERIFICATION_REPORT
--BOUNDARY_CONTENT_DELIVERY_VERIFICATION_REPORT
Content-Type: application/xml
XML Object for DV Report- 1
--BOUNDARY_CONTENT_DELIVERY_VERIFICATION_REPORT
Content-Type: application/xml
XML Object for DV Report - 2
--BOUNDARY_CONTENT_DELIVERY_VERIFICATION_REPORT
Content-Type: application/xml
XML Object for DV Report - 3
--BOUNDARY_CONTENT_DELIVERY_VERIFICATION_REPORT
Content-Type: application/xml
XML Object for DV Report - 4
--BOUNDARY_CONTENT_DELIVERY_VERIFICATION_REPORT--
```

Fourth Aspect of the Invention: Combination of PtP Repair and DV Report

In some embodiments of the present invention, the same network element may act as both PtP repair server and DV report server.

The receivers that require PtP repair may start the repair sessions at a time randomly distributed between T_session_complete and T_session_complete+max_wait_time_repair, cf. FIG. 2b. At the end of the repair session i.e., once the receiver received all data objects of a set of data objects, it can send the DV report also within the same session (cf. step 33 of the flowchart of FIG. 3). This approach saves an additional PtP session for DV reporting. The DV report still follows the format specified according to the third aspect of the present invention.

The present invention has been described above by means of preferred embodiments. It should be noted that there are alternative ways and variations which will be evident to a skilled person in the art and can be implemented without deviating from the scope and spirit of the appended claims. In particular, the present invention is by no means restricted to application in the context of the MBMS. It may equally well be deployed in all types of system where point-to-point acknowledgement and/or point-to-point repair of sets of data objects that are transmitted in point-to-multipoint transmission sessions is required.

The invention claimed is:

1. A method comprising:
    receiving, at a receiver, a maximum verification wait time signaled to a plurality of receivers, wherein at least one time instant at which said receiver is allowed to transmit a delivery verification report to acknowledge reception of a set of data objects transmitted to said receivers in a point-to-multipoint session at least partially depends on said signaled maximum verification wait time, and
    receiving a maximum repair wait time signaled to said receivers, wherein at least one time instant at which said receiver is allowed to transmit a repair request to indicate that reception of at least one repair data object is required at least partially depends on said signaled maximum repair wait time,
    wherein said at least one time instant at which said receiver is allowed to transmit a delivery verification report is randomly selected from a time interval that is at least partially determined by said maximum verification wait time, and wherein said at least one time instant at which said receiver is allowed to transmit a repair request is randomly selected from a time interval that is at least partially determined by said maximum repair wait time.

2. The method according to claim 1, wherein said delivery verification report is to be transmitted to a delivery verification report server within a point-to-point transmission session.

3. The method according to claim 2, wherein said delivery verification report at least comprises an identifier of a transmitter of said set of data objects, an identifier of said delivery verification report server, an identifier of said point-to-multipoint transmission session, and an identifier of said receiver that transmits said delivery verification report.

4. The method according to claim 3, wherein said delivery verification report further comprises an installation notification related to an installation of said transmitted set of data objects at said receiver.

5. The method according to claim 3, wherein said identifiers are included in an Extended Markup Language object.

6. The method according to claim 5, wherein said Extended Markup Language object is contained in a Hypertext Transfer Protocol object.

7. The method according to claim 1, wherein said repair request is to be transmitted to a repair request server within a point-to-point transmission session.

8. The method according to claim 1, wherein said maximum repair wait time is smaller than or equal to said maximum verification wait time.

9. The method according to claim 1, further comprising:
    receiving an identifier of a delivery notification report server, to which said delivery verification report is to be reported, and an identifier of a repair server, to which said repair request is to be transmitted, signaled to said receivers.

10. The method according to claim 9, wherein said signaling of said wait times and said identifiers takes place during an announcement phase of said point-to-multipoint transmission session.

11. The method according to claim 9, wherein said signaling of said wait times and said identifiers is accomplished by a Session Description Protocol.

12. The method according to claim 9, wherein said signaling of said wait times and said identifiers takes place during said transmission of said set of data objects from said transmitter to said receivers.

13. The method according to claim 9, wherein said transmission of said set of data objects to said receivers is at least partially controlled by the File Transfer over Unidirectional Transport protocol, and wherein said signaling of said times and said identifiers is accomplished via a File Delivery Table instance of said protocol.

14. The method according to claim 1, wherein said receiver is configured to transmit only one delivery verification report that acknowledges the reception of at least two of at least two sets of data objects transmitted within respective point-to-multipoint transmission sessions from one or more transmitters.

15. The method according to claim 14, wherein said one delivery verification report comprises one set of identifiers for each of said at least two sets of data objects the reception of which is acknowledged, wherein each of said sets of identifiers comprises an identifier of the transmitter related to the respective acknowledged set of data objects, an identifier of the delivery verification report server related to the respective acknowledged set of data objects, an identifier of the point-to-multipoint transmission session related to the respective acknowledged set of data objects, and an identifier of said receiver that transmits said one delivery verification report, wherein each of said sets of identifiers is contained in an Extended Markup Language object, and wherein said Extended Markup Language objects are contained in a multipart Multi-purpose Internet Mail Extensions structure of an Hypertext Transfer Protocol object.

16. A computer-readable medium containing a software application program code stored thereon, the software application program code comprising:
    program code for causing a receiver to receive a maximum verification wait time transmitted to a plurality of receivers, wherein at least one time instant at which said receiver is allowed to transmit a delivery verification report to acknowledge reception of a set of data objects transmitted to said receivers from a transmitter in a point-to-multipoint session at least partially depends on said signaled maximum verification wait time, and
    program code for causing said receiver to receive a maximum repair wait time signaled to said receivers, wherein at least one time instant at which said receiver is allowed to transmit a repair request to indicate that reception of at least one repair data object is required at least partially depends on said signaled maximum repair wait time,
    wherein said at least one time instant at which said receiver is allowed to transmit a delivery verification report is randomly selected from a time interval that is at least partially determined by said maximum verification wait time, and wherein said at least one time instant at which said receiver is allowed to transmit a repair request is randomly selected from a time interval that is at least partially determined by said maximum repair wait time.

17. An apparatus comprising:
    a signaling component configured to signal a maximum verification wait time to a plurality of receivers, wherein at least one time instant at which at least one of said receivers is allowed to transmit a delivery verification report to acknowledge reception of a set of data objects transmitted to said receivers from a transmitter in a point-to-multipoint session at least partially depends on said signaled maximum verification wait time, and said signaling component further configured to signal a maximum repair wait time to said receivers, wherein at least one time instant at which at least one of said receivers is allowed to transmit a repair request to indicate that reception of at least one repair data object is required at least partially depends on said signaled maximum repair wait time, wherein said at least one time instant at which said at least one receiver is allowed to transmit a delivery verification report is randomly selected from a time interval that is at least partially determined by said maximum verification wait time, and wherein said at least one time instant at which said at least one receiver is allowed to transmit a repair request is randomly selected from a time interval that is at least partially determined by said maximum repair wait time.

18. The apparatus according to claim 17, wherein said maximum repair wait time is smaller than or equal to said maximum verification wait time.

19. The apparatus according to claim 17, further comprising:
signaling an identifier of a delivery notification report server, to which said delivery verification report is to be reported, and an identifier of a repair server, to which said repair request is to be transmitted, to said receivers.

20. The apparatus according to claim 19, wherein said signaling of said wait times and said identifiers takes place during an announcement phase of said point-to-multipoint transmission session.

21. The apparatus according to claim 19, wherein said signaling of said wait times and said identifiers is accomplished by a Session Description Protocol.

22. The apparatus according to claim 19, wherein said signaling of said wait times and said identifiers takes place during said transmission of said set of data objects from said transmitter to said receivers.

23. The apparatus according to claim 19, wherein said transmission of said set of data objects to said receivers is at least partially controlled by the File Transfer over Unidirectional Transport protocol, and wherein said signaling of said times and said identifiers is accomplished via a File Delivery Table instance of said protocol.

24. A computer-readable medium having software application program code stored thereon, the software application program code comprising:
program code for causing a transmitter to signal a maximum verification wait time to a plurality of receivers, wherein at least one time instant at which at least one of said receivers is allowed to transmit a delivery verification report to acknowledge reception of a set of data objects transmitted to said receivers from said transmitter in a point-to-multipoint session at least partially depends on said signaled maximum verification wait time, and program code for causing said transmitter to signal a maximum repair wait time to said receivers, wherein at least one time instant at which at least one of said receivers is allowed to transmit a repair request to indicate that reception of at least one repair data object is required at least partially depends on said signaled maximum repair wait time, wherein said at least one time instant at which said at least one receiver is allowed to transmit a delivery verification report is randomly selected from a time interval that is at least partially determined by said maximum verification wait time, and wherein said at least one time instant at which said at least one receiver is allowed to transmit a repair request is randomly selected from a time interval that is at least partially determined by said maximum repair wait time.

25. An apparatus comprising:
a reception component configured to receive, at a receiver, a maximum verification wait time signaled to a plurality of receivers, wherein at least one time instant at which said receiver is allowed to transmit a delivery verification report to acknowledge reception of a set of data objects transmitted to said receivers from a transmitter in a point-to-multipoint session at least partially depends on said signaled maximum verification wait time, said reception component further configured to receive a maximum repair wait time signaled to said receivers, wherein at least one time instant at which said receiver is allowed to transmit a repair request to indicate that reception of at least one repair data object is required at least partially depends on said signaled maximum repair wait time, wherein said at least one time instant at which said receiver is allowed to transmit a delivery verification report is randomly selected from a time interval that is at least partially determined by said maximum verification wait time, and wherein said at least one time instant at which said receiver is allowed to transmit a repair request is randomly selected from a time interval that is at least partially determined by said maximum repair wait time.

26. The apparatus according to claim 25, wherein said apparatus is configured to transmit said delivery verification report to a delivery verification report server within a point-to-point transmission session.

27. The apparatus according to claim 25, wherein said apparatus is configured to transmit said repair request to a repair request server within a point-to-point transmission session.

28. The apparatus according to claim 26, wherein said delivery verification report at least comprises an identifier of a transmitter of said set of data objects, an identifier of said delivery verification report server, an identifier of said point-to-multipoint transmission session, and an identifier of said receiver that transmits said delivery verification report.

29. The apparatus according to claim 28, wherein said delivery verification report further comprises an installation notification related to an installation of said transmitted set of data objects at said receiver.

30. The apparatus according to claim 28, wherein said identifiers are included in an Extended Markup Language object.

31. The apparatus according to claim 30, wherein said Extended Markup Language object is contained in a Hypertext Transfer Protocol object.

32. The apparatus according to claim 25, wherein said maximum repair wait time is smaller than or equal to said maximum verification wait time.

33. The apparatus according to claim 25, further being configured to receive an identifier of a delivery notification report server, to which said delivery verification report is to be reported, and an identifier of a repair server, to which said repair request is to be transmitted, signaled to said receivers.

34. The apparatus according to claim 33, wherein said signaling of said wait times and said identifiers takes place during an announcement phase of said point-to-multipoint transmission session.

35. The apparatus according to claim 33, wherein said signaling of said wait times and said identifiers is accomplished by a Session Description Protocol.

36. The apparatus according to claim 33, wherein said signaling of said wait times and said identifiers takes place during said transmission of said set of data objects from said transmitter to said receivers.

37. The apparatus according to claim 33, wherein said transmission of said set of data objects to said receivers is at least partially controlled by the File Transfer over Unidirectional Transport protocol, and wherein said signaling of said times and said identifiers is accomplished via a File Delivery Table instance of said protocol.

38. The apparatus according to claim 25, wherein said receiver is configured to transmit only one delivery verification report that acknowledges the reception of at least two of at least two sets of data objects transmitted within respective point-to-multipoint transmission sessions from one or more transmitters.

39. The apparatus according to claim 38, wherein said one delivery verification report comprises one set of identifiers for each of said at least two sets of data objects the reception of which is acknowledged, wherein each of said sets of identifiers comprises an identifier of the transmitter related to the respective acknowledged set of data objects, an identifier of the delivery verification report server related to the respective acknowledged set of data objects, an identifier of the point-to-multipoint transmission session related to the respective acknowledged set of data objects, and an identifier of said receiver that transmits said one delivery verification report, wherein each of said sets of identifiers is contained in an Extended Markup Language object, and wherein said Extended Markup Language objects are contained in a multipart Multi-purpose Internet Mail Extensions structure of an Hypertext Transfer Protocol object.

40. A method comprising:
signaling a maximum verification wait time to a plurality of receivers, wherein at least one time instant at which at least one of said receivers is allowed to transmit a delivery verification report to acknowledge reception of a set of data objects transmitted to said receivers from a transmitter in a point-to-multipoint session at least partially depends on said signaled maximum verification wait time, and
signaling a maximum repair wait time to said receivers, wherein at least one time instant at which at least one of said receivers is allowed to transmit a repair request to indicate that reception of at least one repair data object is required at least partially depends on said signaled maximum repair wait time,
wherein said at least one time instant at which said at least one receiver is allowed to transmit a delivery verification report is randomly selected from a time interval that is at least partially determined by said maximum verification wait time, and wherein said at least one time instant at which said at least one receiver is allowed to transmit a repair request is randomly selected from a time interval that is at least partially determined by said maximum repair wait time.

41. The method according to claim 40, wherein said maximum repair wait time is smaller than or equal to said maximum verification wait time.

42. The method according to claim 40, further comprising:
signaling an identifier of a delivery notification report server, to which said delivery verification report is to be reported, and an identifier of a repair server, to which said repair request is to be transmitted, to said receivers.

43. The method according to claim 42, wherein said signaling of said wait times and said identifiers takes place during an announcement phase of said point-to-multipoint transmission session.

44. The method according to claim 42, wherein said signaling of said wait times and said identifiers is accomplished by a Session Description Protocol.

45. The method according to claim 42, wherein said signaling of said wait times and said identifiers takes place during said transmission of said set of data objects from said transmitter to said receivers.

46. The method according to claim 42, wherein said transmission of said set of data objects to said receivers is at least partially controlled by the File Transfer over Unidirectional Transport protocol, and wherein said signaling of said times and said identifiers is accomplished via a File Delivery Table instance of said protocol.

47. An apparatus comprising: means for signaling a maximum verification wait time to a plurality of receivers, wherein at least one time instant at which at least one of said receivers is allowed to transmit a delivery verification report to acknowledge reception of a set of data objects transmitted to said receivers from a transmitter in a point-to-multipoint session at least partially depends on said signaled maximum verification wait time, and
means for signaling a maximum repair wait time to said receivers, wherein at least one time instant at which at least one of said receivers is allowed to transmit a repair request to indicate that reception of at least one repair data object is required at least partially depends on said signaled maximum repair wait time,
wherein said at least one time instant at which said at least one receiver is allowed to transmit a delivery verification report is randomly selected from a time interval that is at least partially determined by said maximum verification wait time, and wherein said at least one time instant at which said at least one receiver is allowed to transmit a repair request is randomly selected from a time interval that is at least partially determined by said maximum repair wait time.

48. An apparatus comprising:
means for receiving, at a receiver, a maximum verification wait time signaled to a plurality of receivers, wherein at least one time instant at which said receiver is allowed to transmit a delivery verification report to acknowledge reception of a set of data objects transmitted to said receivers from a transmitter in a point-to-multipoint session at least partially depends on said signaled maximum verification wait time, and
means for receiving a maximum repair wait time signaled to said receivers, wherein at least one time instant at which said receiver is allowed to transmit a repair request to indicate that reception of at least one repair data object is required at least partially depends on said signaled maximum repair wait time,
wherein said at least one time instant at which said receiver is allowed to transmit a delivery verification report is randomly selected from a time interval that is at least partially determined by said maximum verification wait time, and wherein said at least one time instant at which said receiver is allowed to transmit a repair request is randomly selected from a time interval that is at least partially determined by said maximum repair wait time.

* * * * *

UNITED STATES PATENT AND TRADEMARK OFFICE
CERTIFICATE OF CORRECTION

PATENT NO. : 7,631,085 B2  Page 1 of 1
APPLICATION NO. : 10/930703
DATED : December 8, 2009
INVENTOR(S) : Vedantham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1467 days.

Signed and Sealed this

Twenty-first Day of December, 2010

David J. Kappos
*Director of the United States Patent and Trademark Office*